BECKWITH & GAGE.
Corn-Planter.
No. 22,156.
Patented Nov. 30, 1858.
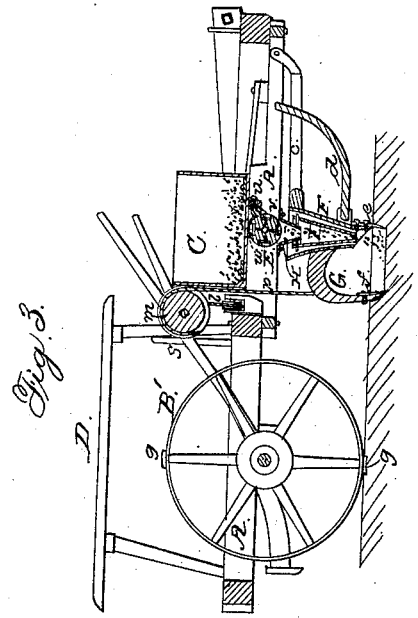
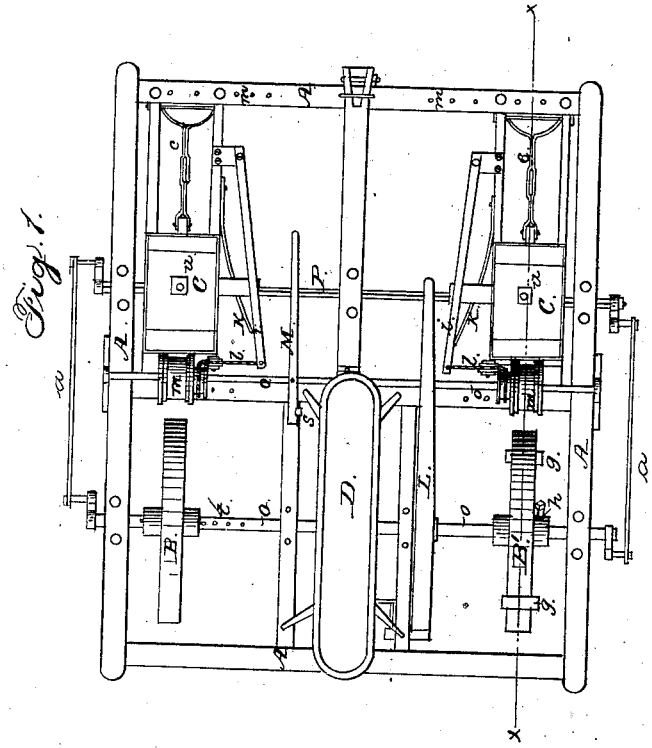
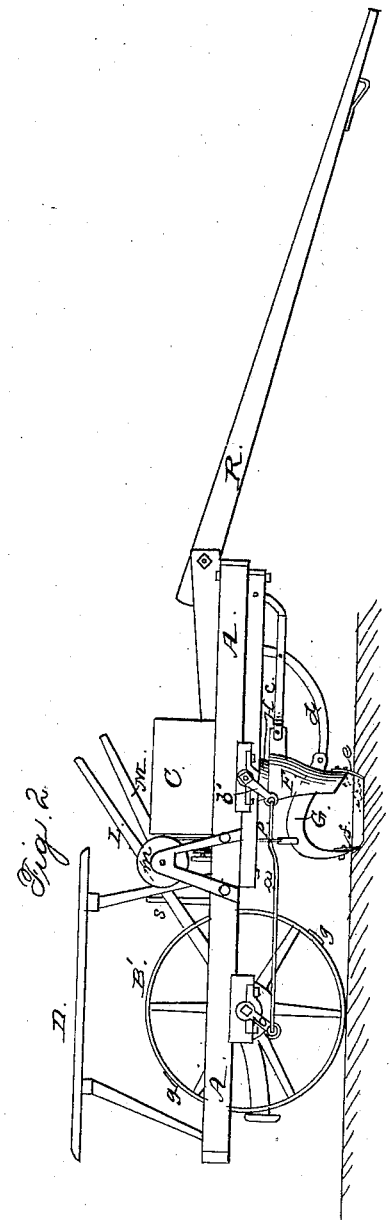

UNITED STATES PATENT OFFICE.

J. F. BECKWITH AND A. G. GAGE, OF ALABAMA, NEW YORK.

IMPROVEMENT IN SEED-PLANTERS.

Specification forming part of Letters Patent No. 22,156, dated November 30, 1858.

*To all whom it may concern:*

Be it known that we, JAMES F. BECKWITH and ADIN. G. GAGE, of Alabama, county of Genesee, State of New York, have invented certain new and useful Improvements in Seed-Planters, of which the following is a full, clear, and exact description, reference being had to the accompanying drawings, forming part of this specification, in which—

Figure 1 represents a plan of a seed-planter embracing our improvements. Fig. 2 represents a side elevation of the same, and Fig. 3 represents a vertical section on the line $x$ $x$ of Fig. 1.

The object of our improvements in seed-planters is to simplify the mechanism for raising the marking-wheel to indicate to the driver of the machine the exact position of the measuring-recesses in the seed-deliverers, and also to arrange the mechanism for cutting off the seed, raising the drill-teeth and the marking-wheel, so that it can be controlled by the driver without his being obliged to turn round in his seat or interfering with his management of his team; and our invention for effecting these objects consists, first, in arranging the lever for raising the marking-wheel so that the axle of the wheel forms the fulcrum of the lever, by which means, when the power is applied directly to the axle of the marking-wheel without the aid of intermediate connections, thereby simplifying the raising mechanism, rendering it less subject to repairs, and less expensive; second, in arranging the crank on the marking-wheel axle in connection with the arrangement of the markers, so that the position of all the measuring-recesses in the feeder is indicated to the driver.

In the accompanying drawings is represented a seed-planter embracing my improvements, which consists of a rectangular frame, A, supported by a pair of wheels, B B', near the rear end. This main frame sustains two longitudinal frames, A', which are placed in a line with the wheels and carry the seeding apparatus. Both of these frames A, and also the wheels, are adjustable laterally to vary the distance between the rows of hills. The wheel B is loose on its axle O, while the wheel B', which carries the markers $g$, to indicate the position of the hills, is made fast to the axle and gives it motion. A box, C, for holding the seed, rests on each frame, A, and on its under side is a feeding-cylinder, E, with adjustable recesses in its periphery. A conical spout, H, surrounds the under side of the feeding-cylinder, and to it is attached a flexible spout, I, which passes nearly to the bottom of a drilling-tube, F, through which the seed passes to the drill. Both the upper and the lower part of the drill-tube is connected to the frame A' by two links, $c$ $d$. The upper one, $c$, is pivoted both to the frame and to the tube, while the lower, $d$, is hinged to the tube and connected with the first by a wooden pin, which, when the point of the tube comes in contact with an obstruction, breaks, and allows the tube to turn and pass over it. A bent arm, G, attached to the rear of the drilling-tube, carries at its lower end an adjustable seed-coverer, $f$.

An adjustable bottom, $v$, in the recesses of the feeding-cylinder can be raised or lowered to adapt it to the different kind of seeds, or increase or diminish the quantity of seed dropped in each hill. Some of these recesses may be closed to vary the distance between the hills.

The feeding-cylinders receive their motion from the axle of the wheels, on the ends of which is a crank, $b$, which is connected by a pitman, $a$, with a crank, $b'$, on the ends of the feeding-cylinder shaft $p$.

A slide, $w$, for cutting off the feed to the feeding-cylinder, passes under the seed-box. This slide is operated by a lever, $i$, in one direction, and by a spring, $k$, in the opposite. A cord, $l$, attached to the lever, passes around a pulley, $m$, on a shaft, $o$, and to the large part of the same pulley is attached a strap, $p$, whose opposite end is attached to the bent arm of the drilling-tube. These pulleys are turned by a lever, M, which raises the drill-tube and at the same time cuts off the feed. The lever M is held by a spring-catch, $s$, the throwing out of which allows the drill-tubes to fall and release the slide-lever, so that it is thrown back by its spring. In front of the cylinder is a brush, $u$, which forms an elastic cut-off between the seed in the box and that in the recesses of the cylinder. The markers are arranged opposite each other on the wheels B and parallel to opposite recesses in the feeding-cylinder, so as to indicate their exact position, and the cranks also serve to indicate the position of the remaining set of recesses in the feeding-cylinder by being arranged parallel thereto and at right angles to the markers, by which means the driver ascertains the exact position of any one of the recesses when he opens the slide to admit the seed to the feeding-cylinder.

A lever, L, turns on the axle, which forms its fulcrum, and by which the marking-wheel is raised, so that it can be turned without advancing the machine, in order to adjust the markers at the commencement of each row to bring the hills in a line transversely; and this lever is so arranged that when the machine is started the motion of the machine releases the lever and allows the marking-wheel to fall to the ground.

A driver's seat is placed on the rear of the frame and over the axle of the wheel, and in such a position that the driver can turn the marking-wheel without moving from his seat. The levers L and M are so arranged in relation to the seat that they also can be worked without the driver leaving his seat or interfering with the management of his team, as they are located on either side and in front, so as not to require the driver to turn in his seat in order to operate them. It will be seen that the raising-lever L is connected directly with the axle of the marking-wheel instead of, as heretofore, by an intermediate link, by which means the power is applied directly to the point of greatest resistance, thereby rendering it more effective and at the same time simplifying the raising mechanism and diminishing its cost.

Having thus described our improvements in seed-planters, what we claim therein as new, and desire to secure by Letters Patent, is—

1. The combination of the raising-lever L, when arranged as described, with the marking-wheel, for the purposes set forth.

2. The combination of the cranks on the axle of the marking-wheel, when arranged as described, with the markers, whereby the exact position of the measuring-recesses in the seed-deliverer are indicated to the driver.

In testimony whereof we have subscribed our names.

J. F. BECKWITH.
A. G. GAGE.

Witnesses:
WILLIAM HOPPOCK,
THOMAS GASTON.